UNITED STATES PATENT OFFICE.

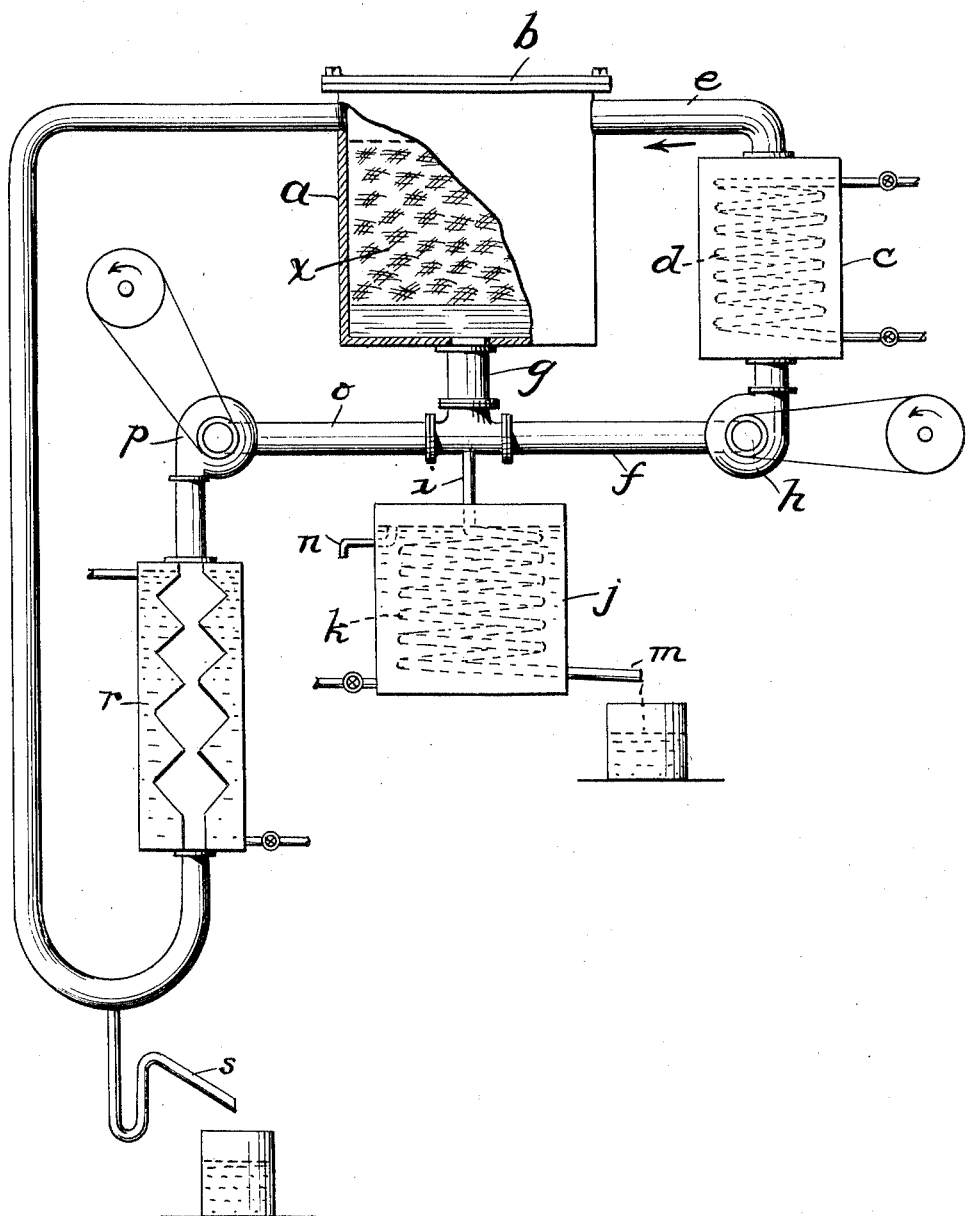

ERNEST DU PONT, OF WILMINGTON, DELAWARE.

PROCESS FOR RECOVERING SOLVENT FROM SMOKELESS POWDER.

1,334,360.  Specification of Letters Patent.  Patented Mar. 23, 1920.

Application filed June 13, 1919. Serial No. 303,908.

*To all whom it may concern:*

Be it known that I, ERNEST DU PONT, a citizen of the United States, residing at Wilmington, county of New Castle, and State of Delaware, have invented a new and useful Improvement in Processes for Recovering Solvent from Smokeless Powder, of which the following is a full, clear, and exact description, reference being had to the accompanying drawings, which form a part of this specification.

In a patent issued to Francis I. du Pont February 11, 1919, No. 1,294,066, there is set forth a process of recovering solvent such as alcohol and ether, from smokeless powder and similar material, in which, by circulation through a mass of powder, an atmosphere is maintained consisting of the vapors of said solvent, a heater being interposed in the endless circuit to supply the heat units which have been abstracted by the conversion of the solvent from the liquid to the gaseous state, and the excess of vapor continually being formed by the addition of such heat units being conducted away from the circulation system and condensed.

This process is perfectly operative and highly efficient, but I have succeeded, while retaining certain essential features of the process and securing the main advantages thereof, in modifying the process in such a way as to expedite the operation and at the same time separate the solvent constituents and thereby avoid the necessity of subsequent separation by distilling off the ether.

The specific use to which I have applied the process is the recovery, from smokeless powder, of ether and alcohol and the separation of the ether from the alcohol.

A convenient means for carrying out the improved process is illustrated in the accompanying drawings, the single figure of which is a view of the apparatus in sectional elevation.

The recovery chamber $a$, containing a layer of smokeless powder or similar material $x$, is provided with a cover $b$, which is maintained closed during the operation. A heating chamber $c$ contains a coil $d$ through which is circulated hot water or steam. A pipe $e$ connects the heating chamber $c$ with the upper part of the recovery chamber $a$ and pipes $f$ and $g$ connect the heating chamber $c$ with the bottom of the recovery chamber $a$, affording an endless path for the circulation of air and vapor, this circulation being induced in the direction of the arrows by means of a fan or blower $h$ interposed in the pipe $f$.

An overflow passage $i$ connects with pipes $f$ and $g$ at their junction and communicates with a condenser, the latter comprising a vessel $j$ containing water in which is immersed a coil of pipes $k$ communicating with the passage $i$ and having at its lower end an outlet $m$ for the escape of air or condensed vapor, as hereinafter described. An overflow pipe $n$ is provided for the water.

The apparatus so far described is essentially the same as that disclosed in the du Pont patent above mentioned. However, to carry out my improved process, I provide a by-pass pipe $o$, which is preferably of considerably larger capacity than the pipe $i$ and through which circulation may be induced by means of a fan or blower $p$. The pipe $o$ communicates with a condenser, the same comprising a vessel $r$ filled with water, the pipe $o$, in its extension through the body of water, being corrugated to facilitate the condensation of one of the fluid constituents flowing therethrough, as hereinafter described. Below the condenser, the pipe $o$ is curved upon itself and extends upward to the top of the recovery chamber $a$. An outflow pipe $s$, shaped to provide a liquid seal, communicates with the pipe $o$ at its lowest level.

The water in condenser $r$ is maintained at a temperature above the boiling point of ether, say at about 40° C. The temperature of the water in condenser $j$ is maintained at a temperature below the boiling point of ether.

Upon starting, the air in the endless circulating system is first heated, thereby soon heating the powder $x$ in chamber $a$ throughout its mass and causing the disengagement of vapor, which soon displaces the air, producing an atmosphere of ether and alcohol vapor. The vapors flow partly through pipe $f$ and partly through pipe $o$. The amount of fluid that will flow through pipe $i$ will not exceed the volume of vapor driven off the powder, less the alcohol vapor condensed in condenser $r$, as hereinafter described. Of the solvent vapor escaping through pipe $o$, only the alcohol will be condensed, the cooled, but uncondensed, ether returning to the top of the chamber $a$. Such solvent vapor as escapes through the pipe $i$ will all be condensed. The heat applied to the vapor flowing through the pipe $f$ should be such that when the vapor reaches the top of the chamber $a$ and mixes with the cooled ether vapor entering from the pipe $o$, the mixed vapor will have a temperature sufficiently high, as it passes through the mass of powder, to drive off more vapor therefrom.

It will be understood that, during the circulation, air escapes from the recovered solvent outlet $m$ and that it is almost immediately completely displaced by the continuously evolving vapor.

The effect of this arrangement is to condense the alcohol out of the ether vapor as fast as its percentage exceeds a very small amount, so that the condenser $r$ condenses substantially only alcohol, and the condenser $j$ condenses substantially only ether.

In process of the hereinbefore mentioned patent, there is a tendency for the percentage of alcohol in the circulating vapors to increase as the operation continues, which somewhat interferes with the drying of the powder. In the present process, the operation is somewhat hastened, in that the alcohol is removed as fast as it accumulates, thereby producing a circulating atmosphere which is drier in regard to alcohol than is the case in process mentioned. In the present process, therefore, the advantages of the other process are to a large degree retained, while the additional advantages are secured of perfect drying of the powder and some expedition of the drying operation.

Having now fully described my invention, what I claim and desire to protect by Letters Patent is:

1. The process of treating smokeless powder and similar material to recover a solvent whose constituents have substantially different boiling points and separate the same in the process of recovery, which comprises gradually vaporizing the solvent, segregating a part of the vapor and subjecting it to the action of a cooling medium to effect the condensation of only the vapor of higher boiling point, returning to and passing through the material the uncondensed constituent, and segregating another part of the vapor and subjecting it to the action of a cooling agent to effect its condensation.

2. The process of treating smokeless powder and similar material to recover a solvent whose constituents have substantially different boiling points and separate the same in the process of recovery, which comprises gradually vaporizing the solvent, segregating the vapor as it is driven through and off the material into three parts, heating one part and returning it to the material, cooling another part to condense only the vapor of higher boiling point and returning the uncondensed vapor to the material, and cooling the third part to condense all the vapor.

3. The process of treating smokeless powder and similar material to recover a solvent whose constituents have substantially different boiling points and separate the same in the process of recovery, which comprises establishing two endless circulations of vapor through said material, heating the vapor in one path, and cooling the vapor in the other path substantially below the boiling point of one constituent but above the boiling point of the other constituent.

4. The process of treating smokeless powder and similar material to recover a solvent whose constituents have substantially different boiling points and separate the same in the process of recovery, which comprises establishing two endless circulations of vapor through said material, heating the vapor in one path, cooling the vapor in the other path substantially below the boiling point of one constituent but above the boiling point of the other constituent, and affording an outlet for excess vapor constantly being formed and condensing the same.

5. The process of treating smokeless powder and similar material to recover a solvent whose constituents have substantially different boiling points and separate the same in the process of recovery, which comprises gradually vaporizing the solvent contained in the material, providing three paths of escape for the vapor, applying force tending to withdraw all the vapor through two of said paths, heating the vapor drawn through one path and returning it to the material, cooling the vapor drawn through the second path substantially below the boiling point of one constituent but above the boiling point of the other constituent and returning the uncondensed constituent to the material, and condensing the excess vapor displaced through the third path.

6. The process of treating smokeless powder and similar material to recover a solvent whose constituents have substantially different boiling points and separate the same in the process of recovery, which comprises gradually vaporizing the solvent contained in the material, condensing and separately removing a part of the solvent consisting mainly of the constituent of higher boiling point, and separately removing a part of the solvent consisting mainly of the constituent of lower boiling point.

7. The process of treating smokeless powder and similar material to recover a solvent whose constituents have substantially different boiling points and separate the same in the process of recovery, which comprises gradually vaporizing the solvent contained in the material, establishing a circulation of the vapor, condensing in the circulatory system the vapor of higher boiling point, affording an overflow outlet for excess vapor, and separately condensing the overflow vapor.

8. The process of treating smokeless powder and similar material to recover a solvent whose constituents have substantially different boiling points and separate the same in the process of recovery, which comprises gradually vaporizing the solvent contained in the material, establishing a forced circulation of the vapor through said material, condensing in the circulatory system the vapor of higher boiling point, affording an overflow outlet of restricted capacity relatively to the capacity of the circulatory system, thereby affording a path of escape for any solvent that is vaporized in excess of that which is condensed in the circulatory system and which is mainly the constituent of lower boiling point, and separately condensing the overflow vapor.

9. The process of treating smokeless powder to recover therefrom contained alcohol and ether, which comprises maintaining a circulation, through a mass of powder, of solvent vapors driven off therefrom, withdrawing sufficient heat from a part of the solvent vapors driven off to effect the condensation of alcohol but not of ether, supplying from an exterior source the heat units which have been abstracted by the conversion of the solvent from the liquid to the gaseous state and by the cooling of ether in the specified condensation of alcohol, conducting the excess solvent vapor away from the circulating system, and condensing the vapor thus conducted from the circulating system.

In testimony of which invention, I have hereunto set my hand, at Wilmington, Delaware, on this 29th day of May, 1919.

ERNEST DU PONT.